United States Patent
Kurata

(10) Patent No.: US 10,539,428 B2
(45) Date of Patent: Jan. 21, 2020

(54) NAVIGATION DEVICE AND INFORMATION PROVIDING METHOD

(71) Applicant: Sony Corporation, Tokyo (JP)

(72) Inventor: Daisuke Kurata, Tokyo (JP)

(73) Assignee: Sony Corporation, Tokyo (JP)

( * ) Notice: Subject to any disclaimer, the term of this patent is extended or adjusted under 35 U.S.C. 154(b) by 195 days.

(21) Appl. No.: 14/747,885

(22) Filed: Jun. 23, 2015

(65) Prior Publication Data

US 2015/0294664 A1 Oct. 15, 2015

Related U.S. Application Data

(63) Continuation of application No. 12/420,396, filed on Apr. 8, 2009, now abandoned.

(30) Foreign Application Priority Data

May 12, 2008 (JP) ................................. 2008-124952

(51) Int. Cl.
*G01C 21/36* (2006.01)

(52) U.S. Cl.
CPC ..... *G01C 21/3697* (2013.01); *G01C 21/3629* (2013.01); *G01C 21/3679* (2013.01)

(58) Field of Classification Search
CPC ............ G01C 21/3697; G01C 21/3629; G01C 21/3679
See application file for complete search history.

(56) References Cited

U.S. PATENT DOCUMENTS

| 7,330,786 | B2 * | 2/2008 | Odinak | G01C 21/3629 342/357.31 |
| 7,574,170 | B2 * | 8/2009 | Jendbro | G06F 17/30899 455/3.01 |
| 9,170,120 | B2 * | 10/2015 | Otani | G01C 21/3629 |
| 2003/0167120 | A1 | 9/2003 | Kawasaki | |
| 2004/0204820 | A1 * | 10/2004 | Diaz | G08G 1/0962 701/522 |
| 2006/0100984 | A1 * | 5/2006 | Fogg | G06F 17/30905 |
| 2006/0287818 | A1 * | 12/2006 | Okude | G01C 21/3492 701/423 |

(Continued)

FOREIGN PATENT DOCUMENTS

| JP | 2002-297655 | 10/2002 |
| JP | 2003-186490 | 7/2003 |

(Continued)

*Primary Examiner* — Peter D Nolan
(74) *Attorney, Agent, or Firm* — Xsensus LLP

(57) ABSTRACT

A navigation device includes: an acquisition section for acquiring plurality of updated content introductory information each representing the latest updated content in a predetermined web site based on user's preference information; a detection section for detecting surrounding position information covering an area around the current position from large number of position information stored in a predetermined storage section; and a search section for searching for particular updated content introductory information corresponding to the surrounding position information detected by the detection section as surrounding updated content introductory information from the plurality of updated content introductory information acquired by the acquisition section.

26 Claims, 6 Drawing Sheets

(56) References Cited

U.S. PATENT DOCUMENTS

| | | |
|---|---|---|
| 2007/0043572 A1 | 2/2007 | Bodin et al. |
| 2007/0073472 A1* | 3/2007 | Odinak ............ G01C 21/3629 701/420 |
| 2007/0078848 A1* | 4/2007 | Sareen ................ G06T 3/4038 |
| 2007/0135091 A1* | 6/2007 | Wassingbo ............ H04M 1/67 455/410 |
| 2007/0155404 A1* | 7/2007 | Yamane ............ G01C 21/3694 455/456.1 |
| 2007/0159355 A1* | 7/2007 | Kelly ............ G08G 1/096716 340/905 |
| 2007/0233370 A1* | 10/2007 | Asada ............... G01C 21/3602 701/431 |
| 2007/0263069 A1* | 11/2007 | Jendbro ............ G06F 17/30899 348/14.02 |
| 2008/0065326 A1* | 3/2008 | Hoashi ................ G01C 21/20 701/432 |
| 2008/0201071 A1* | 8/2008 | Odinak ............ G01C 21/3629 701/533 |
| 2008/0208447 A1 | 8/2008 | Geelen et al. |
| 2008/0221792 A1* | 9/2008 | Nakayama ......... G01C 21/3655 701/431 |
| 2008/0234934 A1* | 9/2008 | Otani ................ G01C 21/3629 701/469 |
| 2008/0243926 A1* | 10/2008 | Wako ................ G06F 17/30017 |
| 2009/0186631 A1 | 7/2009 | Masarie, Jr. |
| 2009/0234565 A1* | 9/2009 | Geelen ............ G01C 21/3629 701/532 |
| 2009/0234579 A1 | 9/2009 | Wang et al. |

FOREIGN PATENT DOCUMENTS

| | | |
|---|---|---|
| JP | 2006-244229 | 9/2006 |
| JP | 2006-258441 | 9/2006 |
| JP | 2007-10887 | 1/2007 |
| JP | 2007-86834 | 4/2007 |
| JP | 2007-278807 | 10/2007 |

\* cited by examiner

NAVIGATION DEVICE AND INFORMATION PROVIDING METHOD

CROSS REFERENCE TO RELATED APPLICATIONS

This application is a continuation of U.S. application Ser. No. 12/420,396, filed Apr. 8, 2009, and is based upon and claims the benefit of priority from prior Japanese Patent Application No. 2008-124952, filed May 12, 2008, the entire contents of each of which are incorporated herein by reference.

BACKGROUND OF THE INVENTION

Field of the Invention

The present invention relates to a navigation device and an information providing method suitably applied to, e.g., a vehicle navigation device.

Description of the Related Art

In a vehicle navigation device, point of interest (POI) information representing locations of interest, such as restaurants and amusement facilities is registered in a hard disk drive in association with map data. The POI information includes name, latitude/longitude, address, category, phone number, uniform resource identifier (URI), and the like of facility.

Some vehicle navigation devices acquire, from a predetermined server, a rich site summary (RSS) file which is written in extensible markup language (XML) and used for publishing update information of a web site, such as title and summary.

When a given category corresponding to the POI is selected by a user, a vehicle navigation device of such a type acquires, from a server, an RSS file containing information about facilities such as restaurants or amusement facilities according to the selected category. Then, the vehicle navigation device designates the location of position information described in the acquired RSS file on a map image displayed on a display (refer to, e.g., Jpn. Pat. Appln. Laid-Open Publication No. 2007-278807).

SUMMARY OF THE INVENTION

As described above, the vehicle navigation device acquires an RSS file containing facility information according to name, latitude/longitude, address, category, phone number, URI and the like registered as the POI.

Thus, there is a problem that a keyword that is not registered as the POI is not selected in the vehicle navigation device. That is, an RSS file corresponding to a user's desired keyword is not acquired.

Further, the vehicle navigation device only acquires facility information based on the POI but does not acquire an RSS file related to various facilities that have previously been registered as the POI. That is, the vehicle navigation device is not able to provide freshly updated information to a user instantaneously.

The present invention has been made in view of the above points, and aims to propose a navigation device and an information providing method capable of providing fresh information about an area around the current position which is suited to the user's taste.

To solve the above problem, according to an aspect of the present invention, there is provided a navigation device including: an acquisition section for acquiring plurality of updated content introductory information each representing the latest updated content in a predetermined web site based on user's preference information; a detection section for detecting surrounding position information covering an area around the current position from large number of position information stored in a predetermined storage section; and a search section for searching for particular updated content introductory information corresponding to the surrounding position information detected by the detection section as surrounding updated content introductory information from the plurality of updated content introductory information acquired by the acquisition section.

With the above configuration, the navigation device previously acquires the plurality of updated content introductory information and searches for the updated content introductory information containing the user's preference information based on the surrounding position information, thereby providing to a user the surrounding updated content introductory information obtained as a result of the search.

Further, according to another aspect of the present invention, there is provided an information providing method including: an acquisition step of acquiring, by an acquisition section, plurality of updated content introductory information each representing the latest updated content in a predetermined web site based on user's preference information; a detection step of detecting, by a detection section, surrounding position information covering an area around the current position from large number of position information stored in a predetermined storage section; and a search step of searching for, by a search section, particular updated content introductory information corresponding to the surrounding position information detected by the detection section as surrounding updated content introductory information from the plurality of updated content introductory information acquired by the acquisition section.

With the above configuration, the navigation device previously acquires the plurality of updated content introductory information and searches for the updated content introductory information containing the user's preference information based on the surrounding position information, thereby providing to a user the surrounding updated content introductory information obtained as a result of the search.

According to the present invention, the navigation device previously acquires the plurality of updated content introductory information and searches for the updated content introductory information containing the user's preference information based on the surrounding position information, thereby providing to a user fresh information about an area around the current position which is suited to the user's taste.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

An embodiment of the present invention will be described in detail below with reference to the accompanying drawings.

(1) RSS Acquisition System

Figure 1:
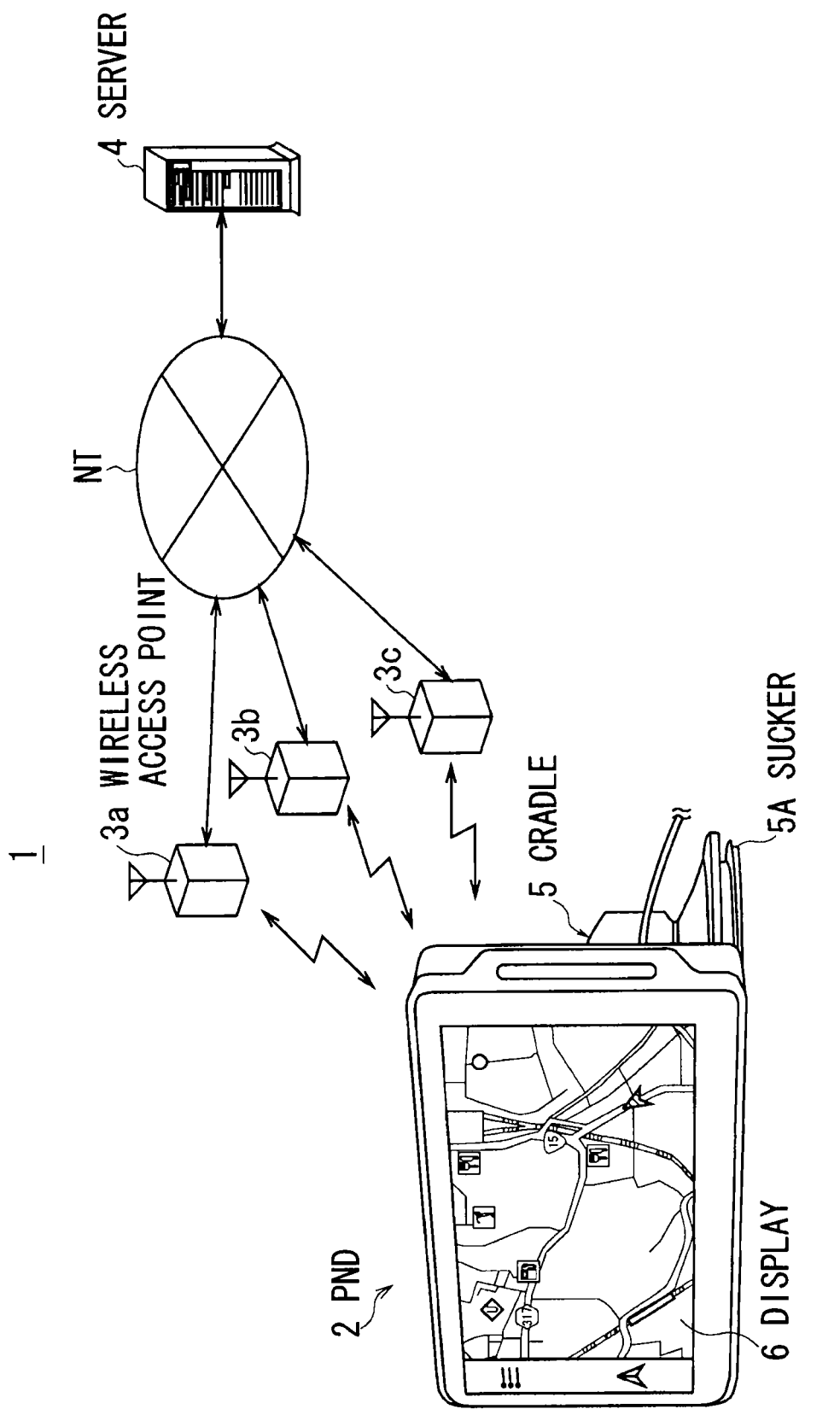
FIG. 1 is a view schematically showing a configuration of an RSS acquisition system.

As shown in FIG. 1, an RSS acquisition system 1 according to an embodiment of the present invention is constituted by a portable navigation device (hereinafter, referred to as personal navigation device (PND)) 2, a plurality of wireless access points 3 (3a, 3b, 3c, . . . ), and a server 4.

The PND 2 is wirelessly connected to one of the plurality of wireless access points 3 and thereby connected to the server 4 via the wireless access point 3 and Internet NT.

The PND 2 is supported by a cradle 5 attached to a dashboard of a vehicle by a sucker 5A and mechanically and electrically connected to the same.

With the above configuration, the PND 2 operates using electrical power supplied from a battery of the vehicle via the cradle 5. The PND has a built-in battery and can operate even when it has been removed from the cradle 5 using electrical power supplied from the built-in battery.

The PND 2 has a display 6 on the front surface thereof and can display a map image and the like corresponding to map data stored in a hard disk drive (not shown) incorporated in the PND 2 on the display 6.

(2) Circuit Configuration of PND

Figure 2:
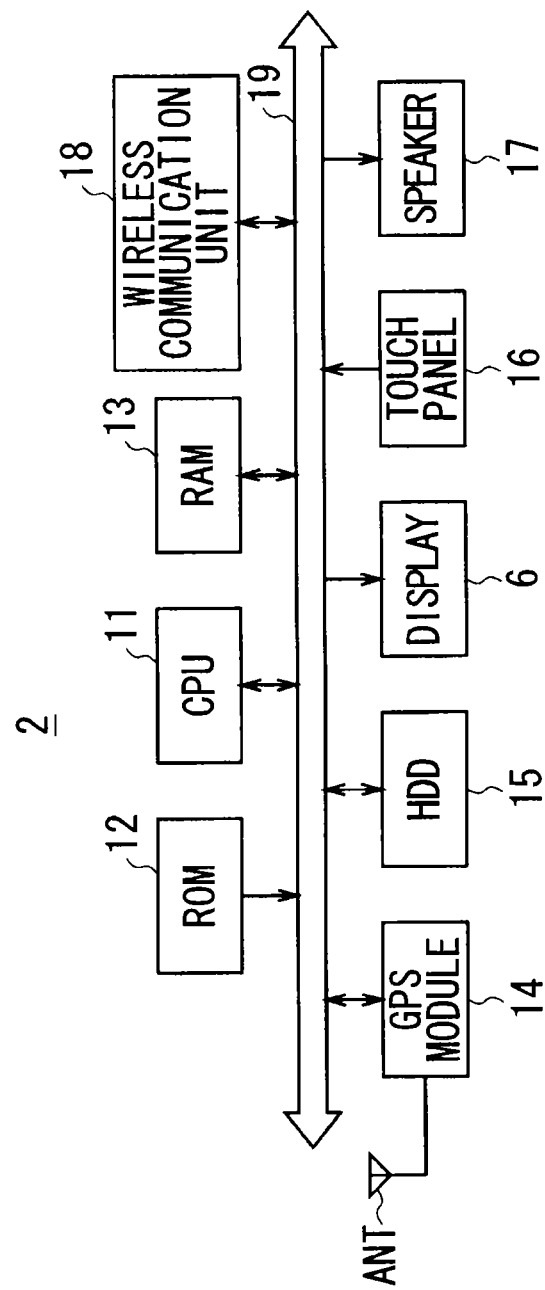
FIG. 2 is a view schematically showing a circuit configuration of a PND.

As shown in FIG. 2, in the PND 2, a central processing unit (CPU) 11 reads a basic program from a read only memory (ROM) 12 and loads it into a random access memory (RAM) 13 for execution to thereby control the operation of respective components of the PND 2 via a bus 19.

Further, the CPU 11 reads out various application programs from the ROM 12 and loads them into the RAM 13 for execution to thereby allowing the PND 2 to carry out various processing such as RSS acquisition/reproduction processing (to be described later) according to the application programs.

The PND 2 transmits satellite signals from a plurality of global positioning system (GPS) satellites received by a GPS antenna ANT to a GPS module 14. The GPS module 14 accurately measures the current position of the vehicle based on orbit data obtained by demodulating the plurality of satellite signals respectively and distance data between the plurality of GPS satellites and vehicle to thereby acquire current position data and transmits the acquired current position data to the CPU 11.

Based on the current position data, the CPU 11 reads out map data of an area around the current position of the vehicle from the hard disk drive 15, generates a map image including the current position, and outputs the generated map image to the display 6 so as to display the map image. A touch panel 16 for receiving user's touch operation is provided on the front surface of the display 6. When a given POI is selected as a destination through touch operation on the touch panel 16, the CPU 11 of the PND 2 searches for a guide route from the current vehicle position to the destination corresponding to the POI and displays a navigation map image representing the guide route on the display 6.

While the vehicle is driving to the destination according the guide route, the CPU 11 of the PND 2 displays the above navigation map image on the display 6 and, at the same time, generates voice information for guiding and assisting (hereinafter, collectively referred to as navigating) the user to the destination, and outputs the voice information from a speaker 17 as navigation voice.

In this manner, the PND 2 provides a navigation function to navigate the vehicle to a user's desired destination.

The PND 2 further includes a wireless communication unit 18 constituted by WI-FI (registered trademark) module and uses the communication unit 18 to search for a wireless-communication-enabled wireless access point 3 (FIG. 1). When having found the wireless-communication-enabled wireless access point 3, the PND 2 is wirelessly connected to the found wireless access point 3 and thereby connected to the server 4 via the access point 3 and the Internet NT.

(3) RSS Acquisition/Reproduction Processing

Next, a procedure of RSS acquisition/reproduction processing of acquiring a large number of RSS files from the server 4 by wireless communication and searching for a particular RSS file corresponding to the POI covering an area around the current vehicle position from the RSS files so as to provide a found RSS file to the user will be described using a functional software configuration of the CPU 11.

When receiving a power supply from a battery (not shown) in response to depression of, e.g., a power button (not shown), the CPU 11 of the PND 2 activates the PND 2 and then executes the RSS acquisition/reproduction processing.

Figure 3:
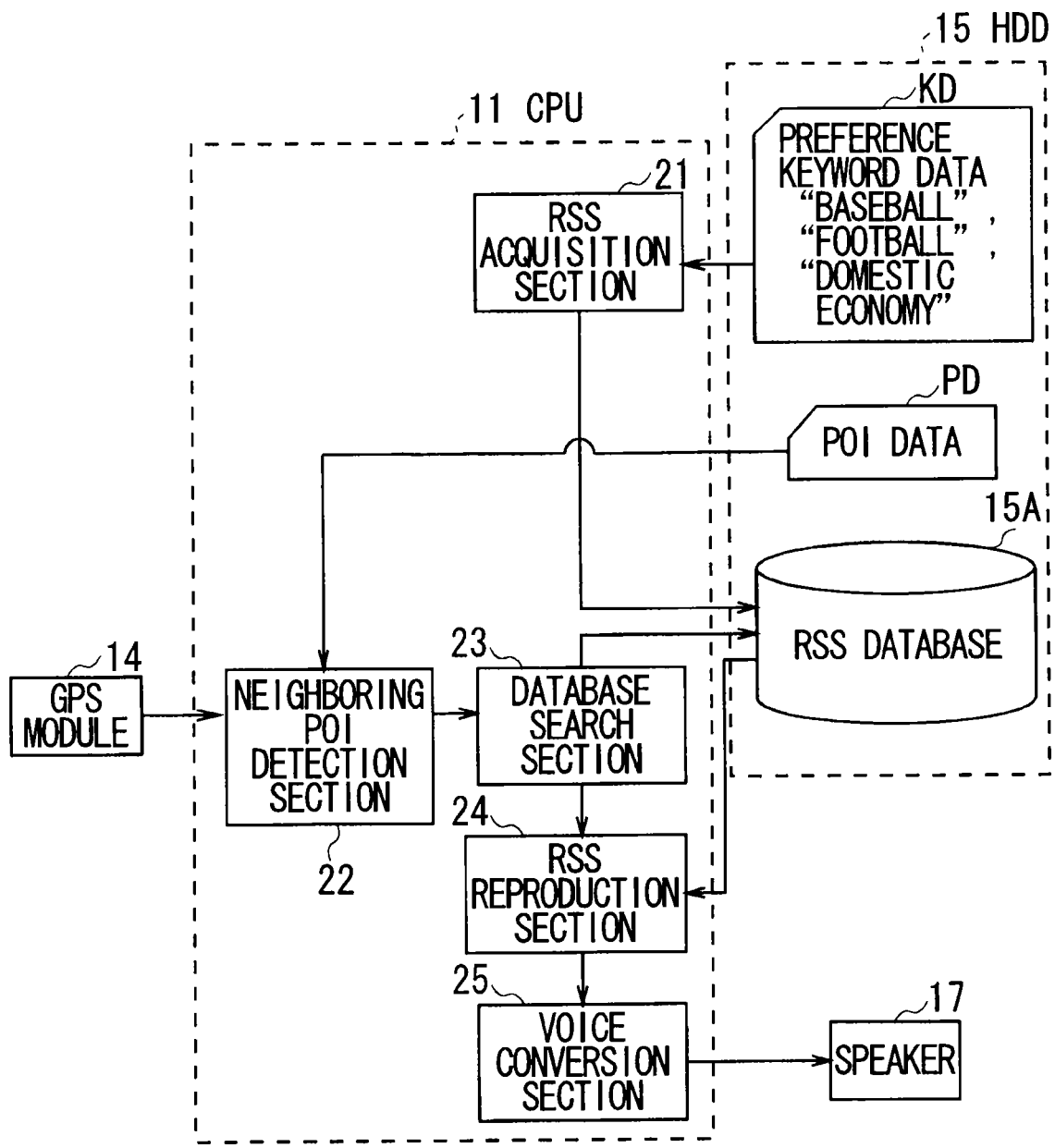
FIG. 3 is a view schematically showing a functional software configuration of a CPU.

When executing the RSS acquisition/reproduction processing according to an application program, as shown in FIG. 3, the CPU 11 of the PND 2 functions like software as an RSS acquisition section 21, a surrounding POI detection section 22, a database search section 23, an RSS reproduction section 24, and a voice conversion section 25.

In response to user's touch operation on the touch panel 16, the RSS acquisition section 21 reads out from the hard disk drive 15 preference keyword data KD containing preference keywords, such as "baseball", "football", and "domestic economy", that have previously been registered in the hard disk drive 15.

The RSS acquisition section 21 then transmits the readout preference keyword data KD to the server 4 via the wireless communication unit 18, wireless access point 3 and the Internet NT.

The server 4 searches for all the RSS files that include the preference keywords written in the preference keyword data KD received from the PND 2 and extracts web site titles and update date/time from the RSS files obtained as a result of the search.

The server 4 then generates new update data containing the extracted web site titles and update date/time and transmits the new update data to the PND 2.

The RSS acquisition section 21 downloads from the server 4 all the RSS files corresponding to the new update data received from the server 4 and stores the acquired RSS files in an RSS database 15A of the hard disk drive 15.

When receiving new update data from the server 4 once again, the RSS acquisition section 21 compares the web site tiles in the RSS files stored in the RSS database 15A and web site tiles contained in the new update data.

The RSS acquisition section 21 then compares, with respect to a pair of the RSS files in which web site titles coincide with each other, the update date/time between the RSS file stored in the RSS database 15A and RSS file contained in the new update data.

When determining as a result of the comparison that the RSS file stored in the RSS database 15A is old, the RSS acquisition section 21 acquires a new updated RSS file from the server 4 and overwrites the new updated RSS file in the RSS database 15A for storage.

Figure 4:
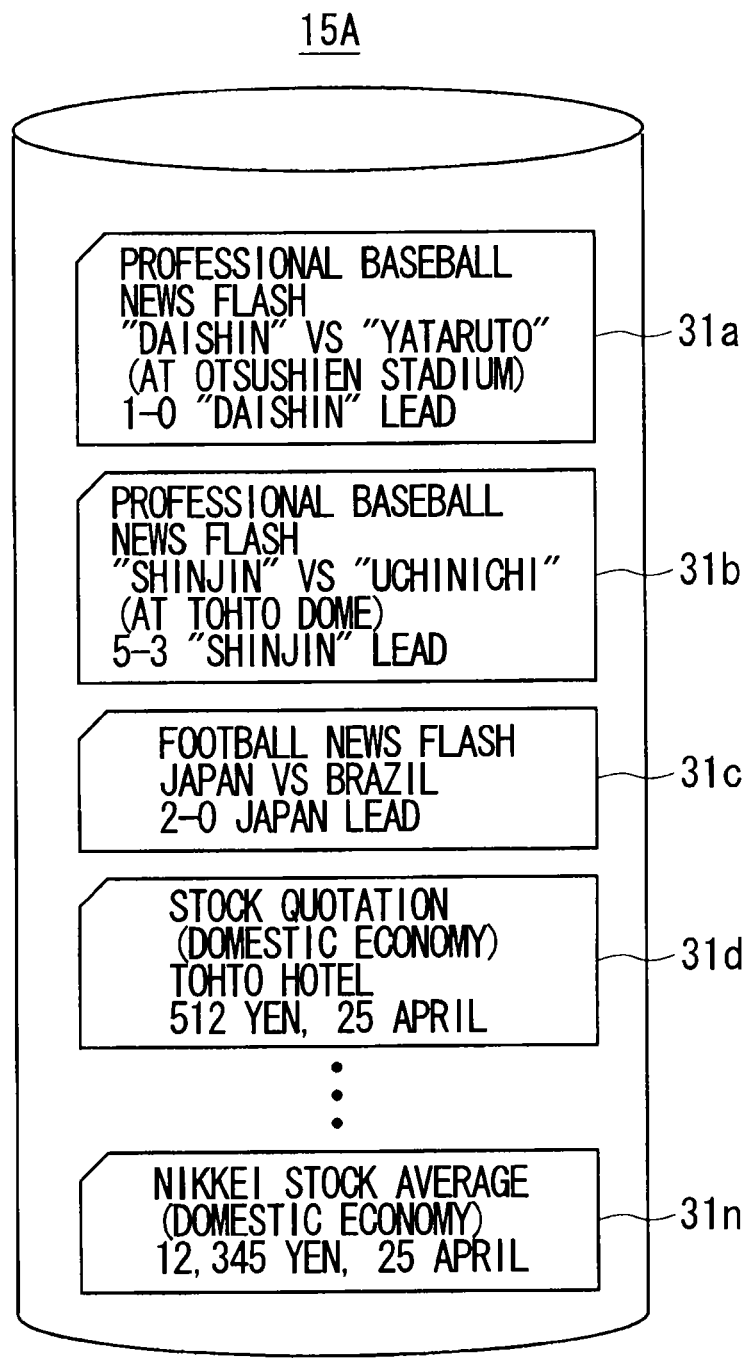
FIG. 4 is a view schematically showing a state where RSS files are stored in an RSS database.

Concretely, as shown in FIG. 4, the RSS acquisition section 21 acquires from the server 4 RSS files 31a to 31n containing the preference keywords written in the preference keyword data KD and stores the RSS files 31a to 31n in the RSS database 15A.

Figure 5:
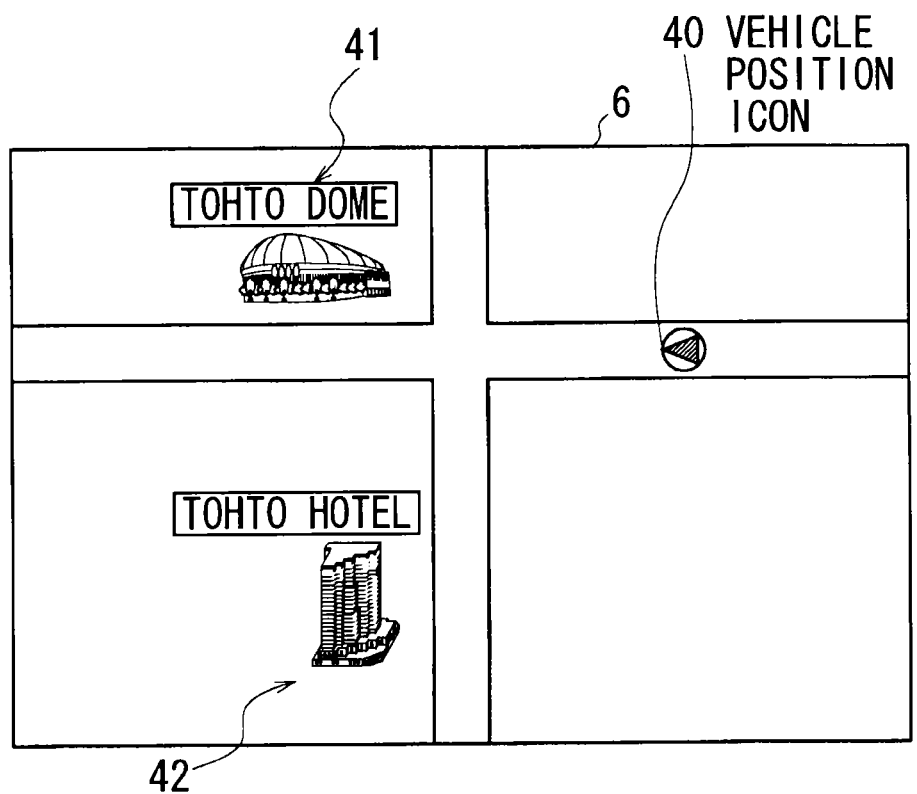
FIG. 5 is a view schematically showing a map image displaying surrounding POIs.

As shown in FIG. 5, when displaying a map image of an area around the current vehicle position based on the current position data supplied from the GPS module 14 on the display 6, the surrounding POI detection section 22 reads out an POI 41 of "Tohto dome" and POI 42 of "Tohto hotel" (hereinafter, referred to as surrounding POIs 41 and 42) displayed together with a vehicle position icon 40 from the POI data PD (FIG. 3). The surrounding POI detection section 22 then transmits the surrounding POIs 41 and 42 to the database search section 23.

The database search section 23 searches for an RSS file containing the character string "Tohto dome" of the surrounding POI 41 or character string "Tohto hotel" of the surrounding POI 42 supplied from the surrounding POI detection section 22 from the RSS files 31a to 31n stored in the RSS database 15A and transmits data of the search result to the RSS reproduction section 24.

In this case, the RSS reproduction section 24 reads out RSS files (hereinafter, referred to as surrounding RSS files) 31b and 31d containing the character string "Tohto dome" of the surrounding POI 41 or character string "Tohto hotel" of the surrounding POI 42 from the RSS database 15A based on the search result data supplied from the database search section 23.

The RSS reproduction section 24 then extracts, e.g., text data including the titles and summaries of the surrounding RSS files 31b and 31d read out from the RSS database 15A and transmits the extracted text data to the voice conversion section 25.

The voice conversion section 25 converts the text data of the surrounding RSS files 31b and 31d supplied from the RSS reproduction section 24 into voice information respectively and outputs via the speaker 17 the voice information as RSS reproduction voice at 10 second intervals in, e.g., the chronological order in terms of update date/time. Thus, the PND 2 can provide the titles and summaries of the surrounding RSS files 31b and 31d to the user by voice.

In the manner as described above, the CPU 11 of the PND 2 acquires the RSS files 31a to 31n containing the preference keywords that have previously been registered by the user from the server 4 and provides the titles and summaries of the surrounding RSS files 31b and 31d containing the character string of the surrounding POI 41 or 42 covering an area around the vehicle position to the user by voice.

(4) RSS Acquisition/Reproduction Processing Procedure

Figure 6:
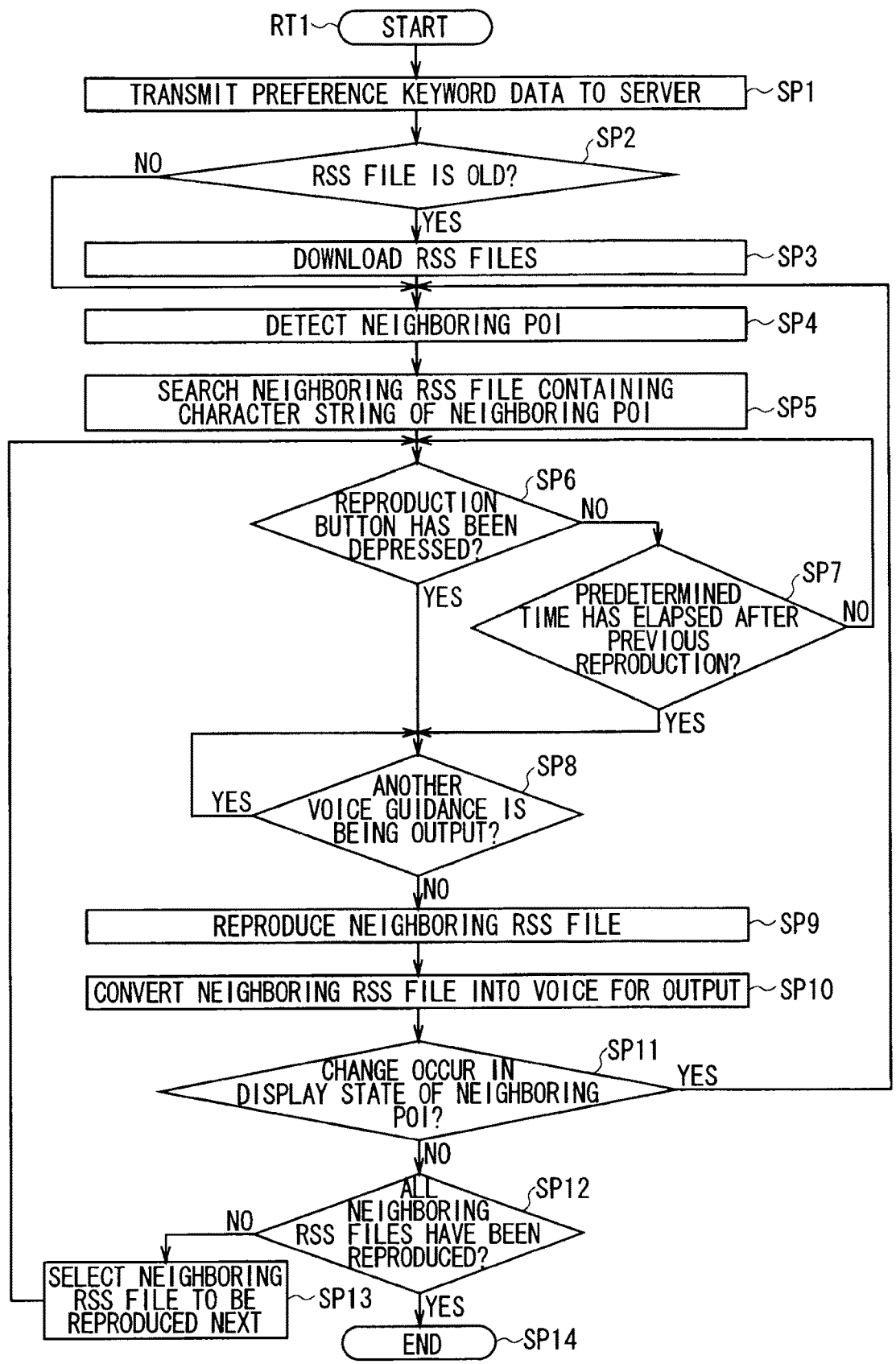
FIG. 6 is a flowchart for explaining a procedure of RSS acquisition/reproduction processing.

Next, a procedure of the RSS acquisition/reproduction processing in which the CPU 11 of the PND 2 acquires the plurality of RSS files 31a to 31n containing the preference keywords, searches for the surrounding RSS files 31b and 31d containing the character strings of the surrounding POIs 41 and 42, and provides the search result to the user as RSS reproduction voice will be described using a flowchart of FIG. 6.

The CPU 11 of the PND 2 enters the start step of routine RT1 and then shifts to step SP1 where the CPU 11 reads out the preference keyword data KD containing preference keywords that have previously been registered in the hard disk drive 15, transmits the readout preference keyword data KD to the server 4 via the wireless communication unit 18, and shifts to step SP2.

At this time, the server 4 searches for all the RSS files 31a to 31n that include the preference keywords written in the preference keyword data KD received from the PND 2 and generates new update data containing web site titles and update date/time of the RSS files 31a to 31n obtained as a result of the search and transmits the new update data to the PND 2.

In step SP2, the CPU 11 of the PND 2 determines, based on a search result data received from the server 4, whether each of the RSS files 31a to 31n is old. When an affirmative result is obtained, the CPU 11 shifts to step SP3. On the other hand, when a negative result is obtained, the CPU 11 shifts to step SP4.

In step SP3, the CPU 11 of the PND 2 downloads the RSS files 31a to 31n from the server 4 anew, stores the acquired RSS files 31a to 31n in the RSS database 15A, and then shifts to step SP4.

In step SP4, the CPU 11 of the PND 2 displays a map image (FIG. 5) containing the vehicle position icon 40 based on the current position data supplied from the GPS module 14 on the display 6, detects, e.g., the surrounding POI 41 of "Tohto dome" and surrounding POI 42 of "Tohto hotel" displayed on the map image, and then shifts to step SP5.

In step SP5, the CPU 11 of the PND 2 searches for the surrounding RSS files 31b and 31d containing the character string "Tohto dome" of the surrounding POI 41 or character string "Tohto hotel" of the surrounding POI 42 from the RSS files 31a to 31n stored in the RSS database 15A and then shifts to step SP6.

In step SP6, the CPU 11 of the PND 2 determines whether a reproduction button (not shown) for reproducing the surrounding RSS files 31b and 31d has been depressed. When an affirmative result is obtained, which means that a user has depressed the reproduction button for immediately viewing information of the surrounding RSS files 31b and 31d, so the CPU 11 shifts to step SP8.

On the other hand, when an affirmative result is obtained in SP6, which means that the reproduction button has not been depressed, so the CPU 11 of the PND 2 shifts to step SP7.

In step SP7, the CPU 11 of the PND 2 determines whether e.g., 10 seconds has elapsed after reproduction of another surrounding RSS file (not shown) different from the surrounding RSS files 31b and 31d. When an affirmative result is obtained, the CPU 11 shifts to step SP8. On the other hand, when a negative result is obtained, the CPU returns to step SP6.

In step SP8, the CPU 11 of the PND 2 determines whether navigate voice different from the RSS reproduction voice is being output via the speaker 17. When an affirmative result is obtained, the CPU 11 returns to step SP8 and waits until the end of the voice output different from the RSS voice.

On the other hand, when a negative result is obtained in step SP8, which means that no voice is output at that moment, so the CPU 11 of the PND 2 shifts to step SP9.

In step SP9, the CPU 11 of the PND 2 determines, with respect to the surrounding RSS files 31b and 31d searched for in step SP5, whether, e.g., which one of the surrounding RSS files has been updated earlier than the other, selects the earlier one (in this case, surrounding RSS file 31b) so as to extract the text data of the title and summary of the surrounding RSS file 31b, and then shifts to step SP10.

In step SP10, the CPU 11 of the PND 2 converts the text data extracted in step SP9 into voice information, outputs the voice information as the RSS reproduction voice via the speaker 17, and then shifts to step SP11.

In step SP11, the CPU 11 of the PND 2 determines whether another surrounding POI (not shown) different from the surrounding POIs 41 and 42 is displayed in the map image on the display 6.

When an affirmative result is obtained in step SP11, which means that another surrounding POI different from the surrounding POIs 41 and 42 is displayed on the map image with the movement of the vehicle position, so the CPU 11 of the PND 2 returns to step SP4 and detects the another surrounding POI.

On the other hand, a negative result is obtained in step SP11, which means that the vehicle position is not moved, so the CPU 11 of the PND 2 shifts to step SP12.

In step SP12, the CPU 11 of the PND 2 determines whether both the surrounding RSS files 31b and 31d have been reproduced. When a negative result is obtained, which means that there exists any surrounding RSS file (in this case, surrounding RSS file 31d) that has not been reproduced, so the CPU 11 shifts to step SP13.

In step SP13, the CPU 11 of the PND 2 selects the surrounding RSS file 31d to be reproduced after the surrounding RSS file 31b and then returns to step SP6.

Then, in the processing from steps SP6 to SP11, the CPU 11 of the PND 2 converts the text data of the surrounding RSS file 31d into the RSS reproduction voice, outputs the RSS reproduction voice via the speaker 17, and then shifts to step SP12.

In step SP12, the CPU 11 of the PND 2 determines once again whether both the surrounding RSS files 31b and 31d have been reproduced. When an affirmative result is obtained, the CPU 11 shifts to step SP14 and ends this flow.

(5) Operation and Effects

In the configuration described above, the CPU 11 of the PND 2 acquires a large number of RSS files 31a to 31n containing user's desired preference keywords from the server 4 and stores the large number of RSS files 31a to 31n in the RSS database 15A as needed.

Then, the CPU 11 of the PND 2 searches for, e.g., the surrounding RSS files 31b and 31d containing the character string of the surrounding POI 41 or 42 covering an area around the vehicle position measured by the GPS module from the large number of RSS files 31a to 31b stored in the RSS database 15A.

Then, the CPU 11 of the PND 2 converts the text data of e.g., the titles and summaries of the surrounding RSS files 31b and 31d containing the surrounding POI 41 or 42 into the RSS reproduction voice and outputs the RSS reproduction voice, thereby providing the RSS information of the surrounding RSS files 31b and 31d to the user.

Thus, by searching for only the surrounding RSS files 31b and 31d containing the character string of the surrounding POI 41 or 42 covering an area around the vehicle position from the RSS files 31a to 31n containing the user's preference keywords, the PND 2 can provide to the user the RSS information as a result of the search.

Further, every time the vehicle position is changed, the CPU 11 of the PND 2 detects the surrounding POIs 41 and 42 covering an area around the vehicle position so as to provide the RSS information of the surrounding RSS files 31b and 31d containing the character string of the surrounding POI 41 or 42. With this configuration, the PND 2 can provide in real time to the user the RSS information such as event or game that is taking place in an area around the vehicle position, thereby attracting a user's attention.

Further, the PND 2 can automatically acquire the RSS information of the surrounding POIs 41 and 42 covering an area around the vehicle position while the user is driving the vehicle, allowing the user to easily acquire the user's desired RSS information in an area around the vehicle position without forcing the user to carry out complicated operation.

Further, the PND 2 can acquire in real time the RSS files 31a to 31n via the wireless communication unit 18, thereby always providing fresh RSS information to the user.

Further, the PND 2 converts the text data of the RSS files 31b and 31d containing the character strings of the surrounding POI 41 or 42 into the RSS reproduction voice and outputs the RSS reproduction information via the speaker 17, eliminating the need for the user to visually confirming the display 6, which further improves driving safety.

According to the above configuration, the PND 2 acquires a large number of RSS files 31a to 31n containing user's desired preference keywords from the server 4 and searches for the surrounding RSS files 31b and 31d containing the character strings of the surrounding POI 41 and 42 covering an area around the vehicle position measured by the GPS module 14. Then, the PND 2 converts e.g., the titles and summaries of the surrounding RSS files 31b and 31d into the RSS reproduction voice and outputs the RSS reproduction voice, thereby providing fresh RSS information about an area around the vehicle position which is suited to the user's taste.

(6) Other Embodiments

Although the preference keywords are previously registered in the above embodiment, the present invention is not limited to this, but the user is allowed to perform touch operation on the touch panel 16 so as to input the preference keywords at, e.g., the start time of the RSS acquisition/reproduction processing. Further, a configuration may be adopted in which the user may register given preference keywords during the RSS acquisition/reproduction processing.

Further, in the above embodiment, the preference keyword data KD is transmitted to the server 4, and the server 4 searches for RSS files that contain the preference keywords written in the preference keyword data KD from the RSS files 31a to 31n. However, the present invention is not limited to this. For example, the CPU 11 of the PND 2 may transmit the preference keyword data KD and character string data of the surrounding POI 41 or 42 to the server 4 so as to allow the server 4 to search for the RSS files 31b and 31d containing the preference keywords written in the preference keyword data KD and character string of the surrounding POI 41 or 42.

Further, in the above embodiment, the CPU 11 of the PND 2 detects the surrounding RSS files 31b and 31d containing the character string of the surrounding POI 41 or 42 from among the RSS files 31a to 31n acquired from the server 4. However, the present invention is not limited to this, but the CPU 11 of the PND 2 may extract the surrounding RSS files 31b and 31d containing, e.g., the address of the vehicle position measured by the GPS module 14 from among the RSS files 31a to 31n.

Further, in the above embodiment, the CPU 11 of the PND 2 detects the surrounding RSS files 31b and 31d containing the character string of the surrounding POI 41 or 42 from among the RSS files 31a to 31n acquired from the server 4. However, the present invention is not limited to this, but the CPU 11 of the PND 2 may extract the surrounding RSS file containing the character string of the POI set as the destination from among the RSS files 31a to 31n.

Further, in the above embodiment, the CPU 11 of the PND 2 converts the titles and summaries of the surrounding RSS files 31b and 31d into the RSS reproduction voice for output. However, the present invention is not limited to this, but the CPU 11 of the PND 2 may display the titles and summaries of the surrounding RSS files 31b and 31d on the display 6 in addition to the output of the RSS reproduction voice.

Further, in the above embodiment, the CPU 11 of the PND 2 converts the titles and summaries of the surrounding RSS files 31b and 31d into the RSS reproduction voice for output. However, the present invention is not limited to this, but the CPU 11 of the PND 2 may output update date/time or indexes of the surrounding RSS files 31b and 31d in the form of the RSS reproduction voice in addition to the titles and summaries thereof.

Further, in the above embodiment, the CPU 11 of the PND 2 outputs the RSS reproduction voice without outputting beep tones and the like. However, the present invention is not limited to this, but the CPU 11 of the PND 2 may output beep tones or blink the display 6 before outputting the RSS reproduction voice.

That is, the PND 2 previously notifies the user of subsequent output of the RSS reproduction voice, thereby preventing the user from failing to hear the RSS reproduction voice.

Further, although the RSS acquisition/reproduction processing is automatically started when a power is supplied from a battery in the above embodiment, the present invention is not limited to this, but the RSS acquisition/reproduction processing may be started in response of predetermined user's operation such as depression of an execution button.

Further, in the above embodiment, the CPU 11 of the PND 2 transmits the preference keyword data KD to the server 4 so as to allow the server 4 to search the RSS file containing the preference keywords written in the preference keyword data KD. However, the present invention is not limited to this, but the CPU 11 of the PND 2 may search for the RSS file containing the preference keywords written in the preference keyword data KD.

Further, in the above embodiment, the CPU 11 of the PND 2 transmits the preference keyword data KD to the server 4 so as to allow the server 4 to search the RSS file containing the preference keywords written in the preference keyword data KD. However, the present invention is not limited to this, but the CPU 11 of the PND 2 may connect to a web site having a previously registered URI to acquire update information of the RSS file written in the header of the web site so as to determine whether the RSS file has been updated. In this case, only when the RSS file has been updated, the CPU 11 of the PND 2 downloads the updated RSS file.

Further, although all the POIs on the map image displayed on the display 6 are detected as the surrounding POIs in the above embodiment, the present invention is not limited to this, but only POIs existing within, e.g., one kilometer radius from the vehicle position may be detected as the surrounding POIs.

Further, in the above embodiment, the CPU 11 of the PND 2 executes the RSS acquisition/reproduction processing of the routine RT1 according to an application program previously stored in the ROM 12. However, the present invention is not limited to this, but the CPU 11 of the PND 2 may execute the RSS acquisition/reproduction processing according to an application program installed from a storage medium, application program downloaded from the Internet, or application program installed from any other source.

Further, in the above embodiment, the PND 2 as a navigation device according to the embodiment of the present invention is constituted by the RSS acquisition section 21 as an acquisition section, surrounding POI detection section 22 as a position information detection section, and database search section 23 as a search section. However, the present invention is not limited to this, but the navigation device may be constituted by the acquisition section, position information detection section, and search section each having any other configuration.

The navigation device and information providing method according to the embodiment of the present invention can be applied not only to the PND but also to various mobile devices provided with a GPS module, such as a mobile phone, a Personal Data Assistance (PDA), a note-type personal computer, or a game device.

The present application contains subject matter related to that disclosed in Japanese Priority Patent Application JP 2008-124952 filed in the Japan Patent Office on May 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    circuitry configured to
        transmit, to a server, predetermined user preference information which is previously determined based on a user input through a touch panel;
        receive, from the server and based on both the transmitted predetermined user preference information and a current position of a vehicle, content information associated with a game occurring at a physical location within a predetermined distance of the current position, the current position being global positioning system (GPS) position information;
        extract text information from the received content information; and
        output voice audio of the extracted text information in a chronological order.

2. The information processing apparatus according to claim 1, further comprising the touch panel, wherein
    the touch panel is configured to receive input of the predetermined user preference information.

3. The information processing apparatus according to claim 1, wherein the circuitry outputs the voice audio via a speaker.

4. The information processing apparatus according to claim 3, wherein the circuitry is further configured to output, via the speaker, the voice audio in chronological order of update date and time of the content information.

5. The information processing apparatus according to claim 3, wherein the circuitry is further configured to output, via the speaker, one of a title and a summary of the content information as the voice audio.

6. The information processing apparatus according to claim 1, further comprising a display configured to display a title and a summary of the content information.

7. The information processing apparatus according to claim 1, wherein the circuitry receives the content information in response to the user input.

8. The information processing apparatus according to claim 1, further comprising a display configured to display the current position.

9. The information processing apparatus according to claim 1, further comprising a display configured to display the current position and display the content information of the game.

10. The information processing apparatus according to claim 1, wherein the circuitry is further configured to receive content information corresponding to a selected destination.

11. A method for an information processing apparatus, the method comprising:
  transmitting, by the information processing apparatus to a server, predetermined user preference information which is previously determined based on a user input through a touch panel;
  receiving, by the information processing apparatus from the server and based on both the transmitted predetermined user preference information and a current position of a vehicle, content information being associated with a game occurring at a physical location within a predetermined distance of the current position, the current position being global positioning system (GPS) position information;
  extracting text information from the received content information; and
  outputting voice audio of the extracted text information in chronological order.

12. The method according to claim 11, wherein the outputting outputs, via a speaker, the voice audio in chronological order of update date and time of the content information.

13. The method according to claim 11, wherein the outputting outputs, via a speaker, one of a title and a summary of the content information as the voice audio.

14. The method according to claim 11, further comprising displaying, via a display, a title and a summary of the content information.

15. The method according to claim 11, wherein the receiving receives the content information in response to the user input.

16. The method according to claim 11, further comprising displaying, via a display, the current position.

17. The method according to claim 11, further comprising:
  displaying, via a display, the current position; and
  displaying, via the display, the content information of the game.

18. The method according to claim 11, wherein the receiving receives content information corresponding to a selected destination.

19. A non-transitory computer-readable storage medium including computer executable instructions, wherein the instructions, when executed by an information processing apparatus, cause the information processing apparatus to:
  transmit, to a server, predetermined user preference information which is previously determined based on a user input through a touch panel;
  receive, from the server and based on both the transmitted predetermined user preference information and a current position of a vehicle, content information associated with a game occurring at a physical location within a predetermined distance of the current position, the current position being global positioning system (GPS) position information;
  extract text information from the received content information; and
  output voice audio of the extracted text information in chronological order.

20. The non-transitory computer-readable storage medium according to claim 19, wherein the information processing apparatus outputs, via a speaker, the voice audio in chronological order of update date and time of the content information.

21. The non-transitory computer-readable storage medium according to claim 19, wherein the information processing apparatus outputs, via a speaker, one of a title and a summary of the content information as the voice audio.

22. The non-transitory computer-readable storage medium according to claim 19, wherein the information processing apparatus is further caused to display, via a display, a title and a summary of the content information.

23. The non-transitory computer-readable storage medium according to claim 19, wherein the information processing apparatus receives the content information in response to the user input.

24. The non-transitory computer-readable storage medium according to claim 19, wherein the information processing apparatus is further caused to display, via a display, the current position.

25. The non-transitory computer-readable storage medium according to claim 19, wherein the information processing apparatus is further caused to:
  display, via a display, the current position; and
  display, via the display, the content information of the game.

26. The non-transitory computer-readable storage medium according to claim 19, wherein the information processing apparatus receives content information corresponding to a selected destination.

* * * * *